United States Patent
Huang et al.

(10) Patent No.: US 12,323,245 B2
(45) Date of Patent: Jun. 3, 2025

(54) TECHNIQUES FOR TRANSMITTING REPETITIONS IN WIRELESS COMMUNICATIONS

(71) Applicant: QUALCOMM Incorporated, San Diego, CA (US)

(72) Inventors: Yi Huang, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/968,533

(22) Filed: Oct. 18, 2022

(65) Prior Publication Data

US 2024/0129064 A1   Apr. 18, 2024

(51) Int. Cl.
| | |
|---|---|
| H04L 1/08 | (2006.01) |
| H04L 5/00 | (2006.01) |
| H04L 5/14 | (2006.01) |
| H04W 72/1268 | (2023.01) |

(52) U.S. Cl.
CPC .............. *H04L 1/08* (2013.01); *H04L 5/0051* (2013.01); *H04L 5/14* (2013.01); *H04W 72/1268* (2013.01)

(58) Field of Classification Search
CPC . H04L 1/08; H04L 5/0051; H04L 5/14; H04L 5/0094; H04L 1/1835; H04L 1/1864; H04L 5/0044; H04W 72/1268

USPC ......................................................... 370/329
See application file for complete search history.

(56) References Cited

U.S. PATENT DOCUMENTS

| | | | |
|---|---|---|---|
| 2020/0351135 A1* | 11/2020 | Moroga | H04L 25/0226 |
| 2022/0303097 A1* | 9/2022 | Zhang | H04B 7/024 |
| 2022/0321389 A1 | 10/2022 | Taherzadeh Boroujeni et al. | |
| 2024/0129932 A1* | 4/2024 | Gao | H04W 72/232 |
| 2024/0276487 A1* | 8/2024 | Feng | H04L 5/0069 |

FOREIGN PATENT DOCUMENTS

| | | | |
|---|---|---|---|
| EP | 3996437 A1 | 5/2022 | |
| WO | WO-2018063845 A1 * | 4/2018 | H04L 5/0012 |
| WO | WO-2022070307 A1 * | 4/2022 | |

OTHER PUBLICATIONS

International Search Report and Written Opinion—PCT/US2023/075028—ISA/EPO—Dec. 12, 2023.

* cited by examiner

*Primary Examiner* — Rownak Islam
(74) *Attorney, Agent, or Firm* — Arent Fox, LLP

(57) ABSTRACT

Aspects described herein relate to generating multiple repetitions of an uplink signal for transmission, and transmitting the multiple repetitions of the uplink signal, wherein each repetition of the multiple repetitions includes a set of phase tracking reference signals (PTRSs). Other aspects relate to receiving the repetitions, and using the PTRSs to determine a phase difference in the repetitions for performing joint channel estimation.

27 Claims, 9 Drawing Sheets

TECHNIQUES FOR TRANSMITTING REPETITIONS IN WIRELESS COMMUNICATIONS

FIELD OF THE DISCLOSURE

Aspects of the present disclosure relate generally to wireless communication systems, and more particularly, to techniques for transmitting repetitions or repeated signals.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to generate multiple repetitions of an uplink signal for transmission, and transmit the multiple repetitions of the uplink signal, wherein each repetition of the multiple repetitions includes a set of phase tracking reference signals (PTRSs).

In another aspect, an apparatus for wireless communication is provided that includes a processor, memory coupled with the processor, and instructions stored in the memory. The instructions are operable, when executed by the processor, to cause the apparatus to receive, for a user equipment (UE), multiple repetitions of an uplink signal, wherein each repetition of the multiple repetitions includes a set of PTRSs, and combine, based on a phase difference computed from the set of PTRSs for each repetition of the multiple repetitions, the multiple repetitions of the uplink signal for decoding the uplink signal.

In another aspect, a method for wireless communication at a UE is provided that includes generating multiple repetitions of an uplink signal for transmission, and transmitting the multiple repetitions of the uplink signal, wherein each repetition of the multiple repetitions includes a set of PTRSs.

In another aspect, a method for wireless communication at a network node is provided that includes receiving, for a UE, multiple repetitions of an uplink signal, wherein each repetition of the multiple repetitions includes a set of phase tracking reference signals PTRSs, and combining, based on a phase difference computed from the set of PTRSs for each repetition of the multiple repetitions, the multiple repetitions of the uplink signal for decoding the uplink signal.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
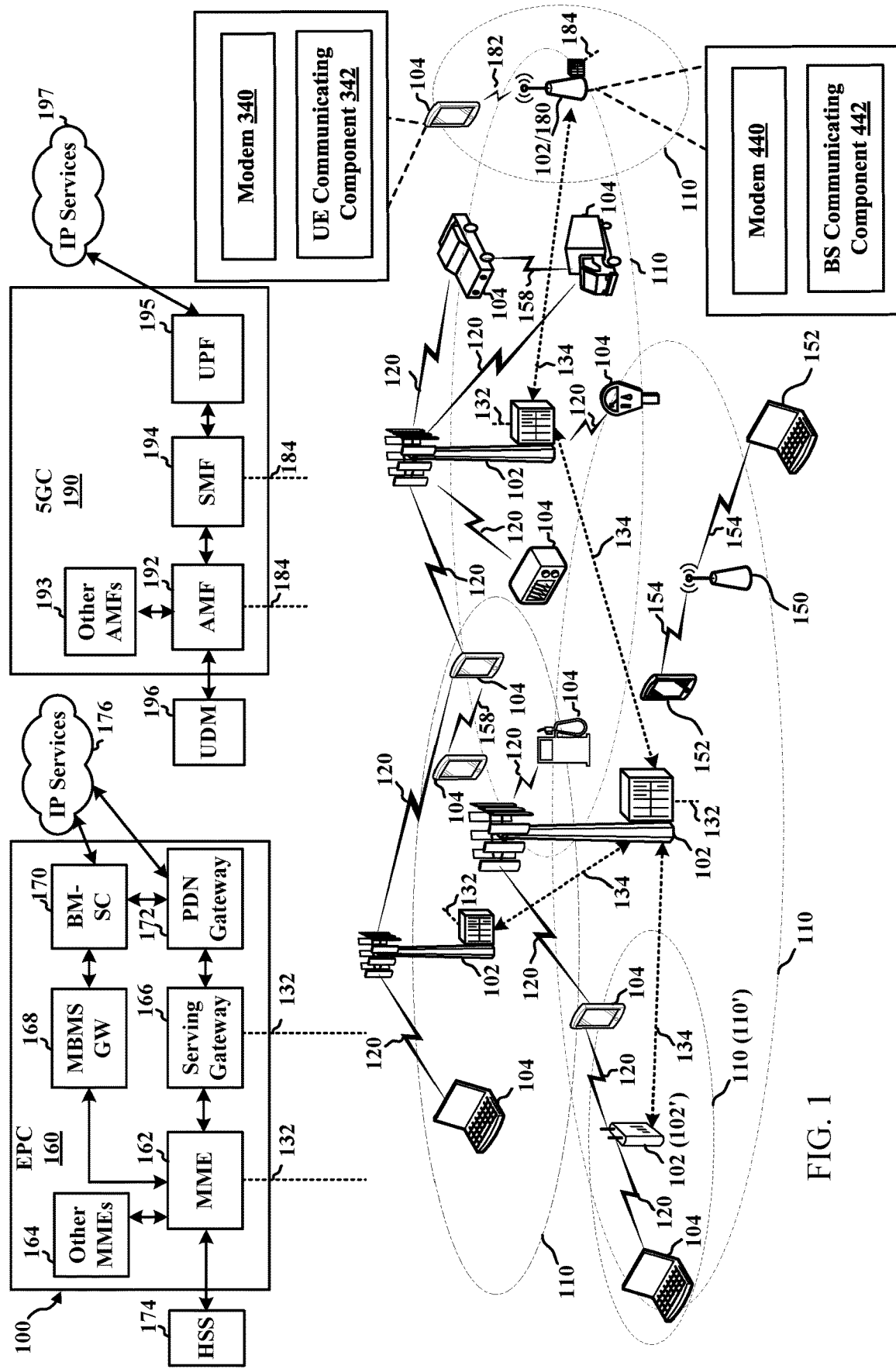
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to transmitting repetitions in wireless communications. In some wireless communication technologies, such as fifth generation (5G) new radio (NR), nodes of the network, such as user equipment (UEs), can be configured to transmit repetitions or repeated signals. For example, UEs can be configured to transmit multiple repetitions of an uplink channel, such as a physical uplink shared channel (PUSCH), physical uplink control channel (PUCCH), physical random access channel (PRACH), sounding reference signal (SRS), etc., where the multiple repetitions can include a first transmission of the uplink channel and any subsequent repeated transmissions of the uplink channel. Transmitting repetitions can improve uplink channel or reference signal coverage, and the improvement can be linearly scaled by the number of repetitions (e.g., two repetitions can improve coverage by 3 decibels (dB), four repetitions can improve coverage by 6 dB, etc.). Also, in 5G NR for example, the network node or other entity receiving the multiple repetitions can perform joint channel estimation (e.g., bundled demodulation reference signal (DMRS) or SRS combining) to further improve the uplink coverage based on the multiple uplink repetitions. Joint channel estimation can typically leverage phase continuity across the repetitions.

To maintain phase continuity between uplink channel repetitions, a set of conditions may be needed. Such conditions may include consistent modulation order or precoding across repetitions, consistent resource block (RB) allocation in terms of length and frequency position, and ensuring intra-slot and inter-slot frequency hopping are not enabled within a repetition bundle. Additional conditions may include consistent power level over transmission of the repetitions, consistent uplink beam over the transmission of the repetitions, less than a 1 millisecond (ms) gap between repetitions, etc. Additional conditions may include, if there is an uplink transmission between the repetitions, the uplink transmissions and the repetitions should have the same peak-to-average power ratio (PAPR) and average power (e.g., PUSCH/PUCCH part of repetitions and SRS should have same PAPR and average power). Additional conditions may include consistent allocated number and locations of physical RBs (PRBs) transmitted for the repetitions, consistent antenna port settings, ensuring that there is no downlink reception scheduled in between repetitions, etc.

Aspects described herein relate to inserting phase tracking reference signals (PTRSs), or sets of PTRSs (e.g., sets of PTRS tones), for or within each of multiple repetitions to allow phase discontinuity among the repetitions. This can facilitate reference signal (RS) bundling (e.g., and thus joint channel estimation) without requiring phase continuity, and removing or easing at least some of the above conditions. In accordance with such aspects, the node receiving signals from the UE can estimate a phase difference between repetitions based on the PTRSs, and can accordingly compensate for the phase difference when combining the repetitions. This can allow UEs/devices to achieve improved coverage without the stringent requirements for phase continuity, which may lead to more efficient radio resource usage, and can accordingly improve user experience with using the network and/or the UEs/devices, etc.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for transmitting multiple repetitions each having a set of PTRSs, in accordance with aspects described herein. In addition, some nodes may have a modem 440 and BS communicating component 442 for combining multiple received repetitions based on a set of PTRSs for each repetition, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can transmit multiple repetitions of a channel (e.g., PUSCH, PUCCH, PRACH, SRS, etc.) where each repetition can include a set of PTRSs to facilitate phase tracking for each given repetition. BS communicating component 442 can receive the multiple repetitions of the channel, and can combine the multiple repetitions based on computing a phase difference between each of the multiple repetitions of the channel. This can allow the UE 104 to improve coverage by leveraging repetitions without current stringent requirements for joint channel estimation, as described above. Rather, a base station 102 or other device receiving the signals from the UE 104 can determine the phase difference based on the PTRSs, and can compensate for the phase difference in combining the repetitions or otherwise performing joint channel estimation based on the repetitions.

Figure 2:
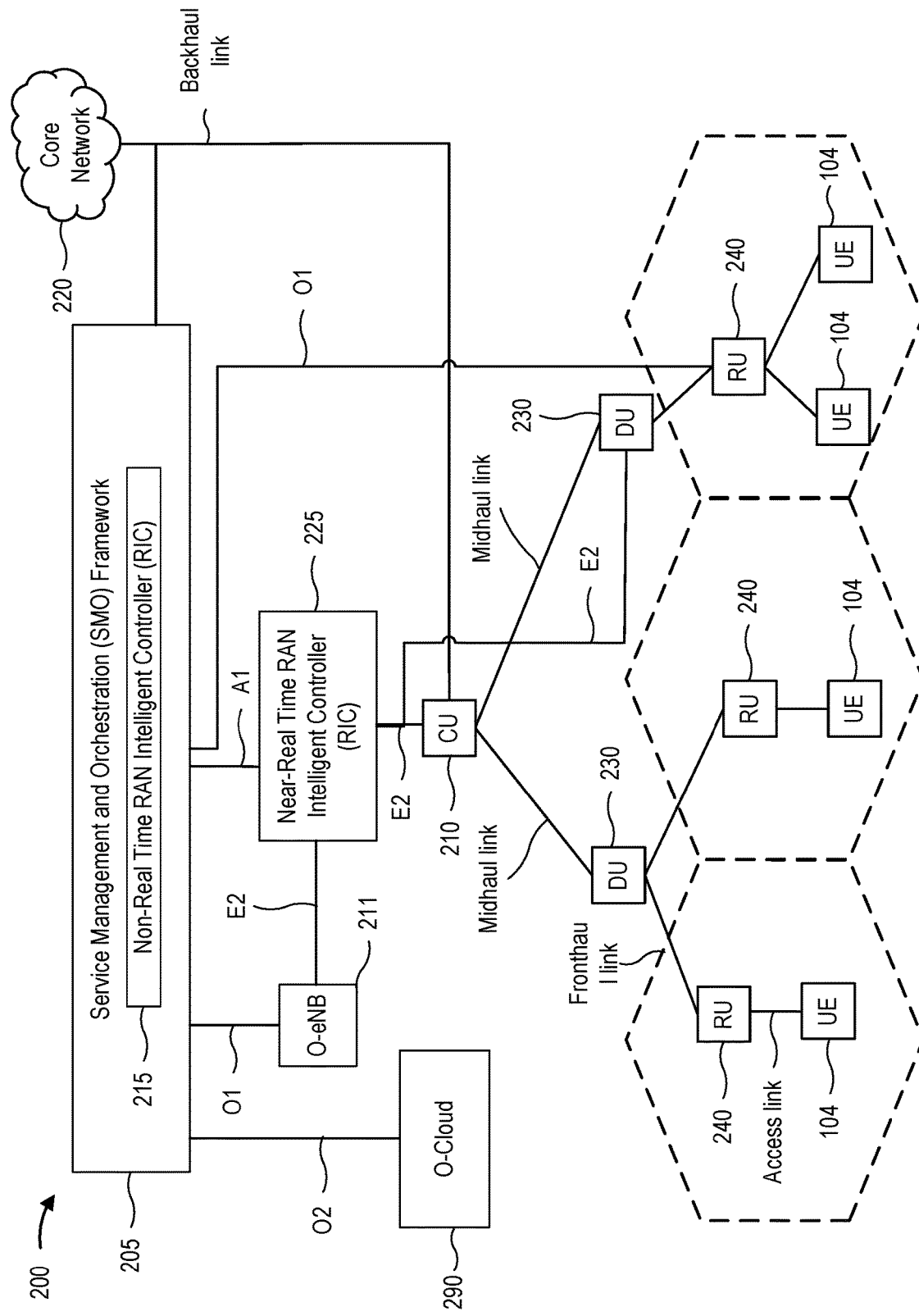
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can receive repetitions and associated PTRSs, perform joint channel estimation, etc., via one or more DUs 230, and/or the like. In another example, BS communicating component 442, as described herein, can be at least partially implemented within a DU 230, and can receive repetitions and associated PTRSs, perform joint channel estimation, etc., via one or more RUs 240, and/or the like.

Figure 3:
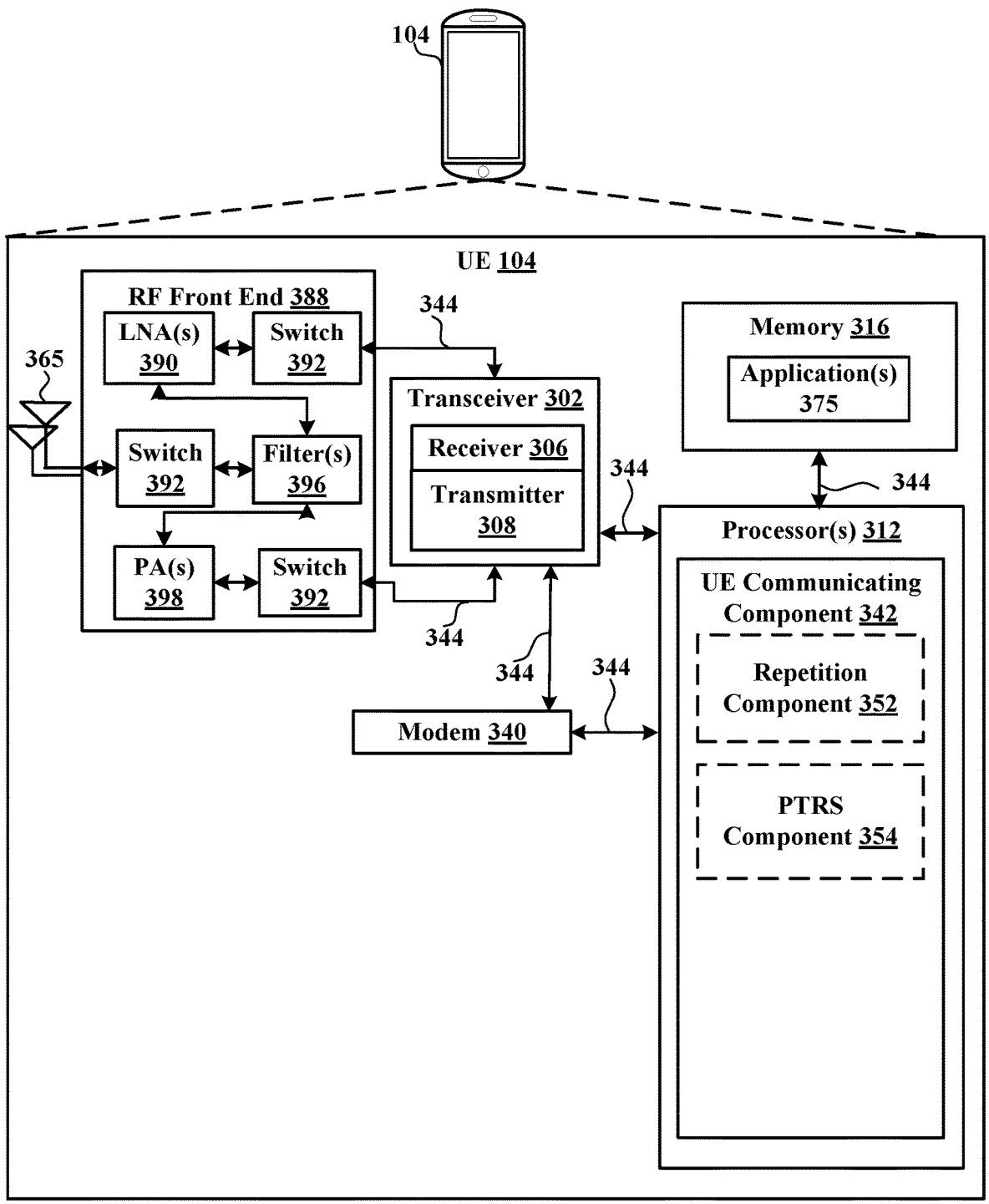
FIG. 3 is a block diagram illustrating an example of a user equipment (UE), in accordance with various aspects of the present disclosure.
Figure 4:
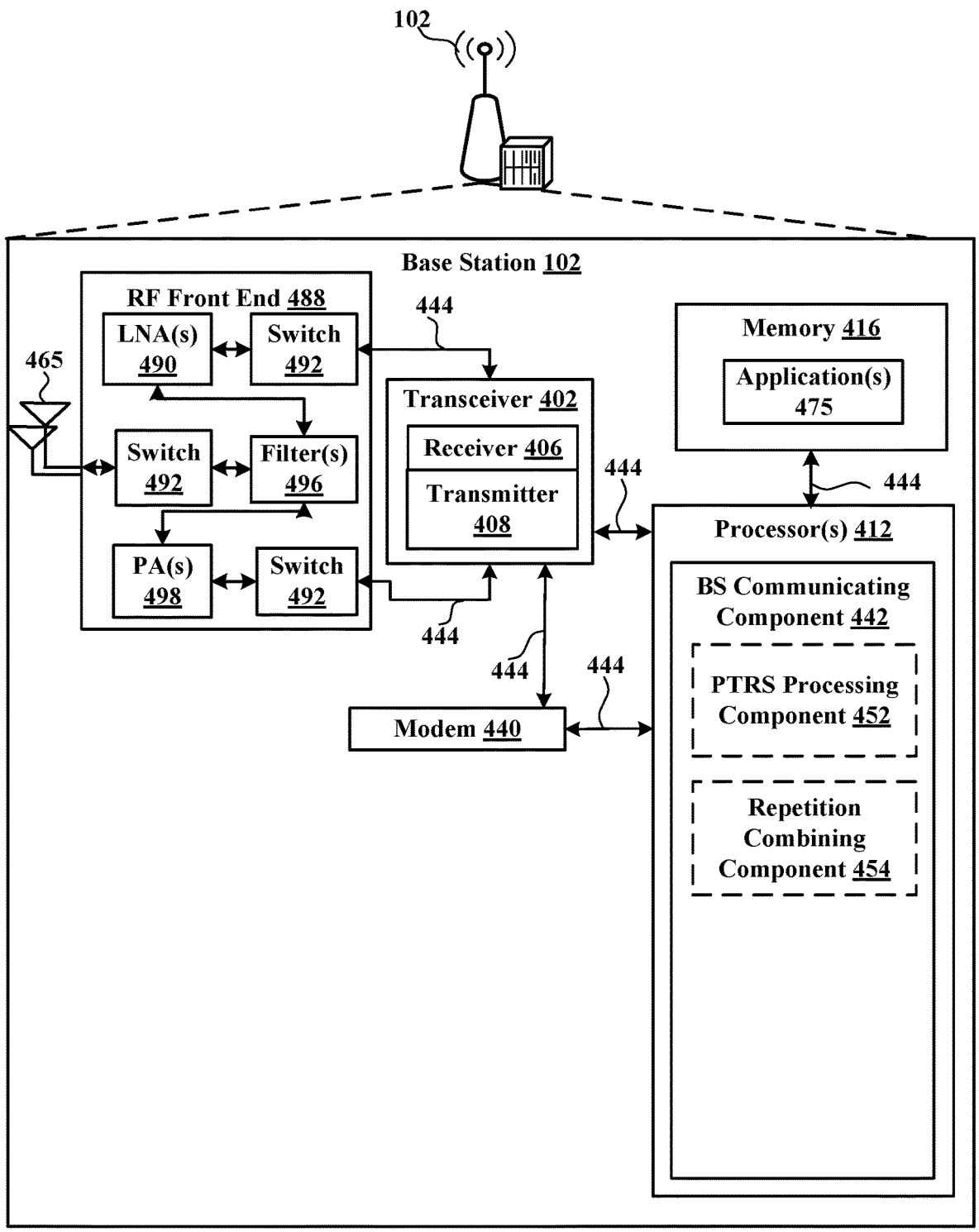
FIG. 4 is a block diagram illustrating an example of a base station, in accordance with various aspects of the present disclosure.
Figure 5:
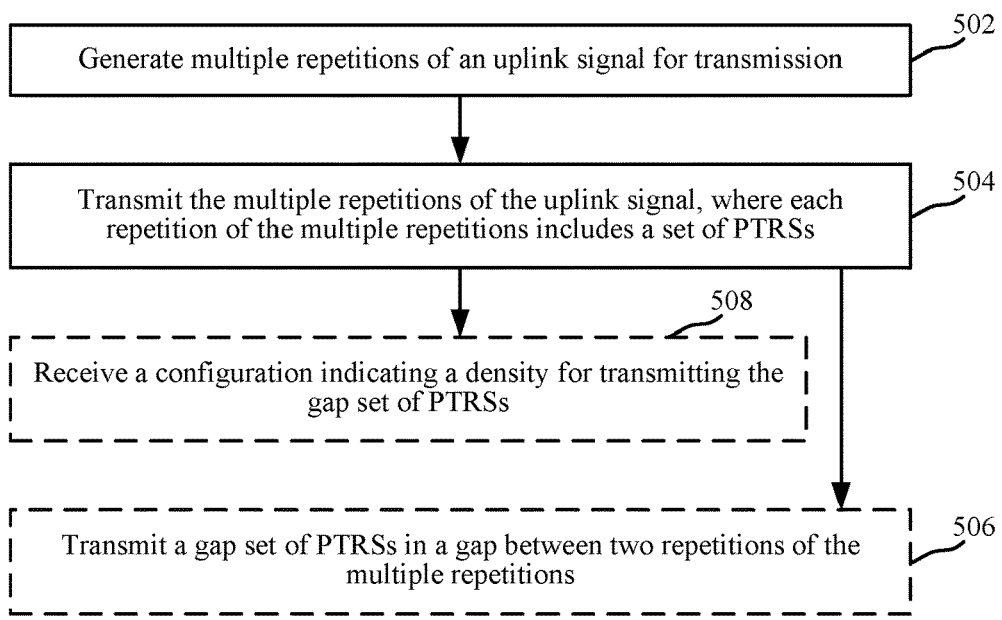
FIG. 5 is a flow chart illustrating an example of a method for transmitting multiple repetitions of a channel with each repetition having a set of phase tracking reference signals (PTRSs), in accordance with aspects described herein.
Figure 6:
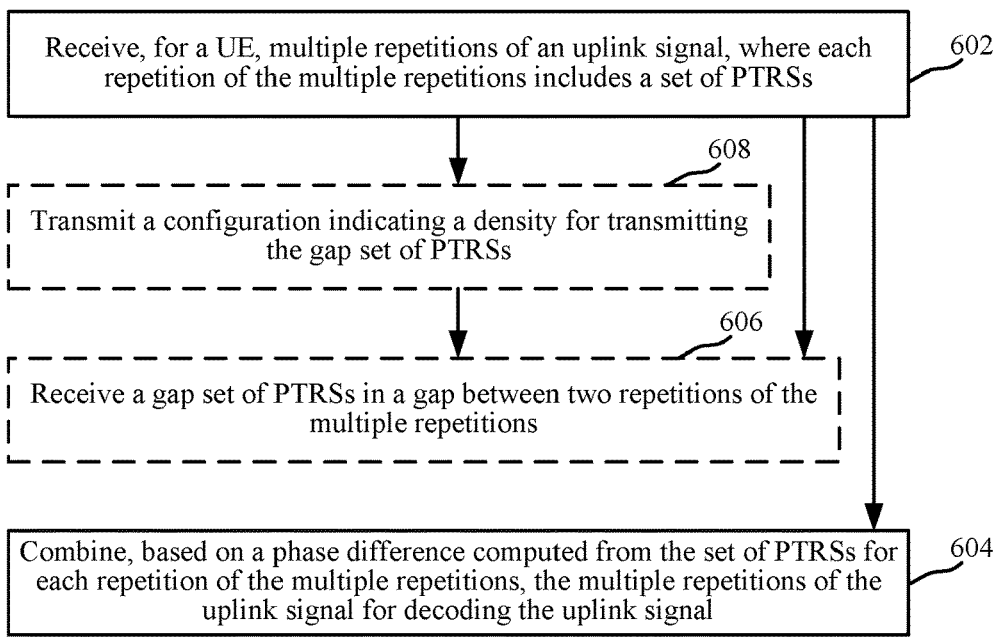
FIG. 6 is a flow chart illustrating an example of a method for combining multiple repetitions of a channel with each repetition having a set of PTRSs, in accordance with aspects described herein.

Turning now to FIGS. 3-9, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for transmitting multiple repetitions each having a set of PTRSs, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a repetition component 352 for generating, obtaining, and/or transmitting multiple repetitions of a channel, and/or a PTRS component 354 for inserting a PTRS, a set of PTRSs, a set of PTRS tones, etc., in each of the multiple repetitions, in accordance with aspects described herein.

In an aspect, the processor(s) 312 may correspond to one or more of the processors described in connection with the UE in FIG. 9. Similarly, the memory 316 may correspond to the memory described in connection with the UE in FIG. 9.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for combining multiple received repetitions based on a set of PTRSs for each repetition, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a PTRS processing component 452 for processing PTRSs in each of multiple repetitions of a channel received from a UE to determine a phase difference between the repetitions, and/or a repetitions combining component 454 for combining the repetitions (e.g., via joint channel estimation) compensating for the phase difference, in accordance with aspects described herein.

In an aspect, the processor(s) 412 may correspond to one or more of the processors described in connection with the base station in FIG. 9. Similarly, the memory 416 may correspond to the memory described in connection with the base station in FIG. 9.

FIG. 5 illustrates a flow chart of an example of a method 500 for transmitting multiple repetitions of a channel with each repetition having a set of PTRSs, in accordance with aspects described herein. FIG. 6 illustrates a flow chart of an example of a method 600 for combining multiple repetitions of a channel with each repetition having a set of PTRSs, in accordance with aspects described herein. In an example, a UE 104 can perform the functions described in method 500 using one or more of the components described in FIGS. 1 and 3. In an example, a network node (e.g., a base station 102, a gNB, a monolithic base station, a portion of a disaggregated base station, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 500, at Block 502, multiple repetitions of an uplink signal for transmission can be generated. In an aspect, repetition component 352, e.g., in conjunction with processor(s) 312, memory 316, transceiver 302, UE communicating component 342, etc., can generate the multiple repetitions of the uplink signal for transmission. For example, repetition component 352 can generate the multiple repetitions for transmission over resources scheduled by the network node, which may include resources in multiple contiguous or non-contiguous time instances (e.g., multiple contiguous or non-contiguous symbols, such as orthogonal frequency division multiplexing (OFDM) symbols, single carrier-frequency division multiplexing (SC-FDM) symbols, etc.), slots of multiple symbols, and/or the like. In an example, the network node may also configure the UE 104 with parameters for transmitting repetitions, such as a number of repetitions to transmit, resources for each repetition, etc. Generating each of the multiple repetitions can include generating a corresponding channel (e.g., PUSCH. PUCCH, PRACH, SRS, etc.) for transmission in resources in multiple symbols, slots, etc., or otherwise obtaining, at a first network layer (e.g., a physical (PHY) layer), the channels or modulated channels from a second higher layer (e.g., a media access control (MAC) layer). In addition, a repetition, as described herein, can include an initial transmission and/or one or more repeated transmissions of the initial transmission.

In method 500, at Block 504, the multiple repetitions of the uplink signal can be transmitted, where each repetition of the multiple repetitions includes a set of PTRSs. In an aspect, UE communicating component 342, e.g., in conjunction with processor(s) 312, memory 316, transceiver 302, etc., can transmit the multiple repetitions of the uplink signal, where each repetition of the multiple repetitions includes a set of PTRSs (e.g., one or more PTRSs or PTRS tones). For example, PTRS component 354 can insert the PTRSs in each of the multiple repetitions, and UE communicating component 342 can, for each repetition, modulate the channel and PTRS tones into a signal for transmission, where the signal has a phase that can be tracked or determined based on the PTRS tones in the signal. In this regard, each repetition signal can have its own phase, and the receiving node can determine or otherwise compensate for the phase difference based on the PTRS tones in the signals.

In method 600, at Block 602, multiple repetitions of an uplink signal can be received, for a UE, where each repetition of the multiple repetitions includes a set of PTRSs. In an aspect, BS communicating component 442, e.g., in conjunction with processor(s) 412, memory 416, transceiver 402, etc., can receive, for the UE, the multiple repetitions of the uplink signal, where each repetition of the multiple repetitions includes a set of PTRSs (e.g., one or more PTRSs or PTRS tones). For example, PTRS processing component 452 can obtain the PTRSs in each of the multiple repetitions, and can determine a phase difference between the PTRSs.

In method 600, at Block 604, the multiple repetitions of the uplink signal can be combined, based on a phase difference computed from the set of PTRSs for each repetition of the multiple repetitions, for decoding the signal. In an aspect, repetition combining component 454, e.g., in conjunction with processor(s) 412, memory 416, transceiver 402, BS communicating component 442, etc., can combine, based on a phase difference computed from the set of PTRSs for each repetition of the multiple repetitions, the multiple repetitions of the uplink signal for decoding the uplink signal. For example, repetition combining component 454 can perform joint channel estimation using the multiple repetitions and with the information on the phase difference between the multiple repetitions. In one example, repetition combining component 454 can use the phase difference to adjust a phase of a given repetition to match that of the initial transmission in combining the repetition(s) and the initial transmission to perform the joint channel estimation. Examples are shown in FIG. 7.

Figure 7:
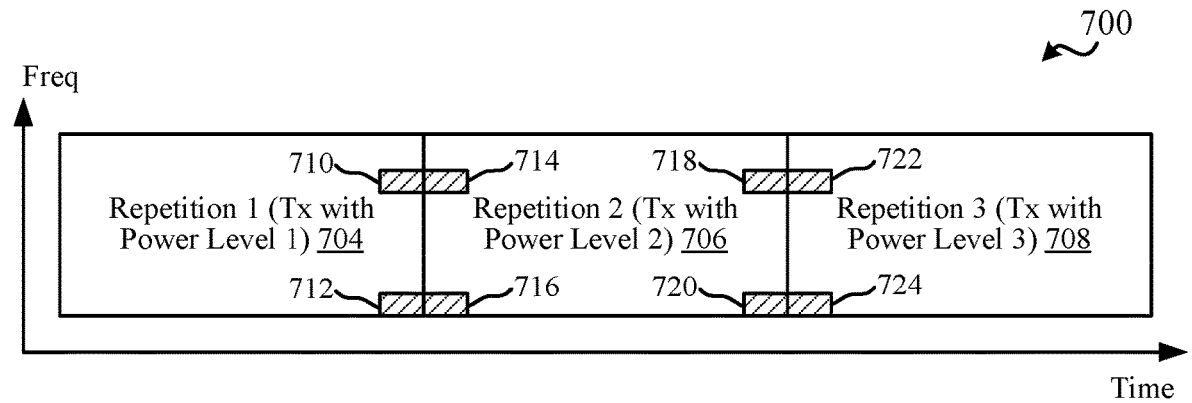
FIG. 7 illustrates examples of resource allocations for multiple repetitions with each repetition having a set of PTRSs, in accordance with aspects described herein.
Figure 7:
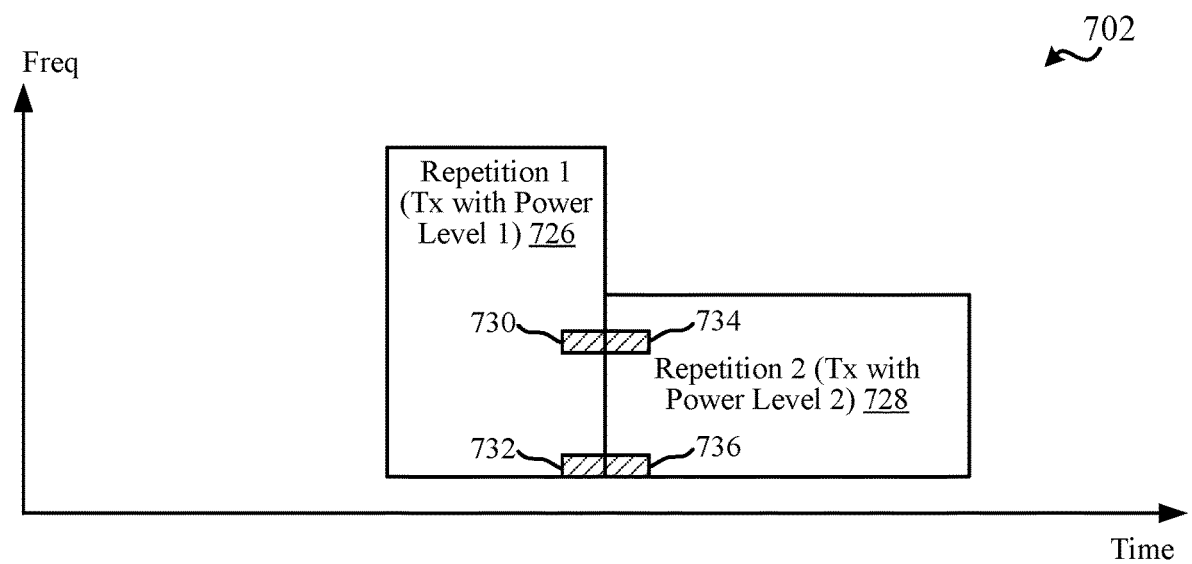

FIG. 7 illustrates examples of resource allocations 700, 702 for multiple repetitions with each repetition having a set of PTRSs. For example, resource allocation 700 can include time and frequency resource allocation for repetition 1 704, repetition 2 706, and repetition 3 708. In this example, the repetitions 704, 706, 708 can be scheduled in adjacent or consecutive time instances (e.g., consecutive slots, symbols, etc.), such that there is no gap in time between the resources scheduled for the repetitions 704, 706, 708. In addition, in this example, the repetitions 704, 706, 708 can be scheduled in the same or similar frequency resources (e.g., the same or similar subcarriers, resource blocks (RBs), etc.) over the time resources. In an example, the UE (e.g., UE 104 and/or an associated UE communicating component 342) can transmit repetitions 704, 706, 708 at different power levels. The repetitions can each have a different phase.

As shown, a PTRS component 354 can add PTRSs (e.g., PTRS tones) in the repetitions, including PTRSs 710, 712 in repetition 1 704, PTRSs 714, 716, 718, 720 in repetition 2 706, and PTRSs 722, 724 in repetition 3 708. In this example, the PTRSs 710, 714 can be back-to-back (e.g., consecutive or adjacent in time resources) and in the same or similar frequency resources in the repetitions 704, 706, as can PTRSs 712, 716. In one example, placing the PTRSs in similar frequency resources in adjacent time resources (e.g., in adjacent OFDM symbols that span a boundary between the two repetitions, also referred to herein as boundary OFDM symbols) can facilitate more accurate estimation of the phase difference between the PTRSs (e.g., between PTRSs 710 and 714 and/or between PTRSs 712 and 716), and thus the phase difference between the repetitions (e.g., repetition 1 704 and repetition 2 706). For example, the PTRSs can thus be transmitted contiguous in time, such as at a tail of a first OFDM symbol and the beginning of a next OFDM symbol, where the set of PTRSs in each repetition are on a time boundary OFDM symbol between each repetition.

In an example, PTRS processing component 452 of a node receiving the repetitions 704, 706, 708 can compute a first phase difference between repetition 1 704 and repetition 2 706 based on the phase difference between PTRSs 710 and 714 and/or between PTRSs 712 and 716, and can compute a second phase difference between repetition 2 706 and repetition 3 708 based on the phase difference between PTRSs 718 and 722 and/or between PTRSs 720 and 724. For example, PTRS processing component 452 can estimate the difference between the two phases of two repetitions assuming the channel does not change across the two boundary OFDM symbols. Repetition combining component 454 can perform joint channel estimation of, or otherwise combine, the repetitions 704, 706, 708 based on the first phase difference and the second phase difference. For example, repetition combining component 454 can account for the phase differences in performing the joint channel estimation or other combining of the repetitions.

For example, resource allocation 702 can include time and frequency resource allocation for repetition 1 726, and repetition 2 728. In this example, the repetitions 726, 728 can be scheduled in adjacent or consecutive time instances (e.g., consecutive slots, symbols, etc.), such that there is no gap in time between the resources scheduled for the repetitions 726, 728. In addition, in this example, the repetitions 726, 728 can be scheduled in a different number of frequency resources (e.g., a different number of subcarriers, RBs, etc.) over the time resources. In an example, the UE (e.g., UE 104 and/or an associated UE communicating component 342) can transmit repetitions 726, 728 at different power levels. The repetitions can each have a different phase.

As shown, a PTRS component 354 can add PTRSs (e.g., PTRS tones) in the repetitions, including PTRSs 730, 732 in repetition 1 726, and PTRSs 734, 736 in repetition 2 728. In this example, the PTRSs 730, 734 can be back-to-back (e.g., consecutive or adjacent in time resources) and in the same or similar frequency resources in the repetitions 726, 728, as can PTRSs 732, 736, though the repetitions 726, 728 may span different numbers of RBs. In an example, PTRS processing component 452 of a node receiving the repetitions 726, 728 can compute a phase difference between repetition 1 726 and repetition 2 728 based on the phase difference between PTRSs 730 and 734 and/or between PTRSs 732 and 736. For example, PTRS processing component 452 can estimate the difference between the two phases of two repetitions assuming the channel does not change across the two boundary OFDM symbols. Repetition combining component 454 can perform joint channel estimation of, or otherwise combine, the repetitions 726, 728 based on the phase difference.

In another example, there may be a time gap between repetitions, and the UE can, in some examples, transmit a set of PTRSs during the gap to facilitate phase estimation across the repetitions. In method 500, optionally at Block 506, a gap set of PTRSs can be transmitted in a gap between two repetitions of the multiple repetitions. In an aspect, UE communicating component 342, e.g., in conjunction with processor(s) 312, memory 316, transceiver 302, etc., can transmit the gap set of PTRSs (e.g., one or more PTRSs or PTRS tones) in the gap between two repetitions of the multiple repetitions. For example, PTRS component 354 can insert the gap set of PTRSs in a time gap between two of the multiple repetitions. For example, the time gap may include a time instance, such as a time slot, symbol, etc., during which a repetition is not scheduled for transmission. The time instance may include an uplink slot or symbol, a downlink slot or symbol etc., as described further herein. Where the time instance includes a downlink slot or symbol, for example, PTRS component 354 can transmit the gap set of PTRSs in an uplink subband during the downlink slot or symbol (e.g., where the uplink subband may be allocated or configured by the network node in a subband full duplex configuration).

In method 600, optionally at Block 606, a gap set of PTRSs can be received in a gap between two repetitions of the multiple repetitions. In an aspect, BS communicating component 442, e.g., in conjunction with processor(s) 412, memory 416, transceiver 402, etc., can receive the gap set of PTRSs (e.g., one or more PTRSs or PTRS tones) in the gap between two repetitions of the multiple repetitions. For example, PTRS processing component 452 can obtain the gap set of PTRSs between the two repetitions, and can compute the phase difference between the set of PTRSs and the gap set of PTRSs to determine the phase difference between the repetitions. For example, PTRS processing component 452 can compute a first phase difference between the gap set of PTRSs and a set of PTRSs in the first repetitions, and a second phase difference between a set of PTRSs in the second repetition and the gap set of PTRSs, and can compute the phase difference between the repetitions based on the first phase difference and the second phase difference (e.g., by summing the first phase difference and the second phase difference). Examples are shown in FIG. 8.

Figure 8:
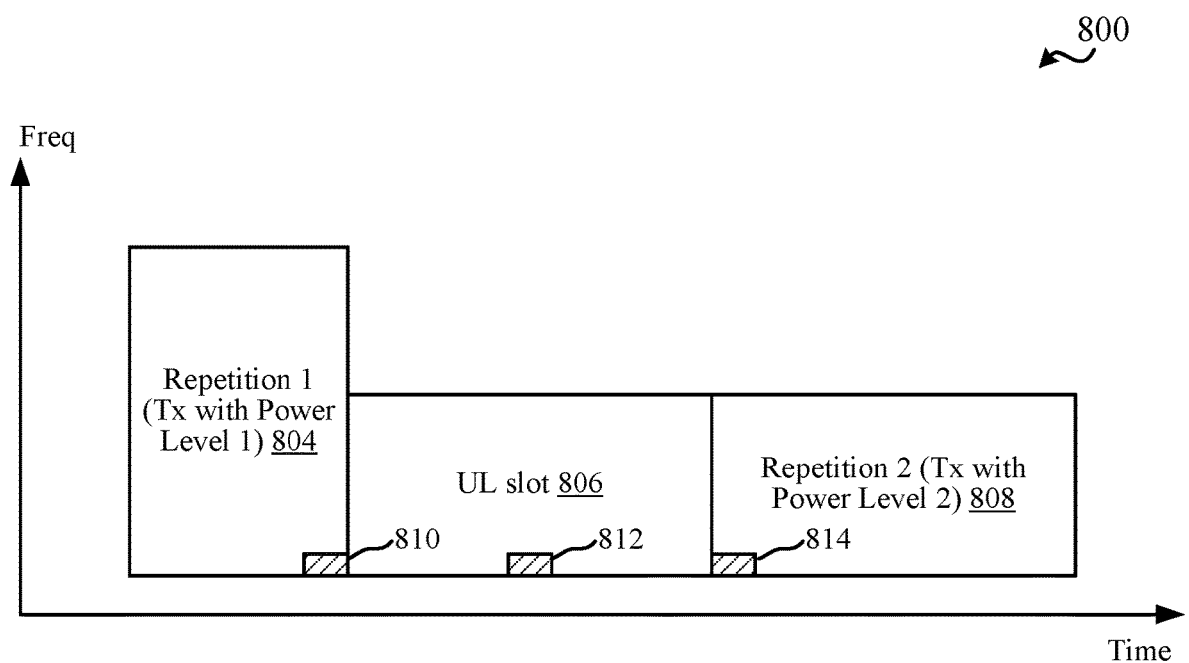
FIG. 8 illustrates examples of resource allocations for multiple repetitions with each repetition having a set of PTRSs including a gap set of PTRSs, in accordance with aspects described herein.
Figure 8:
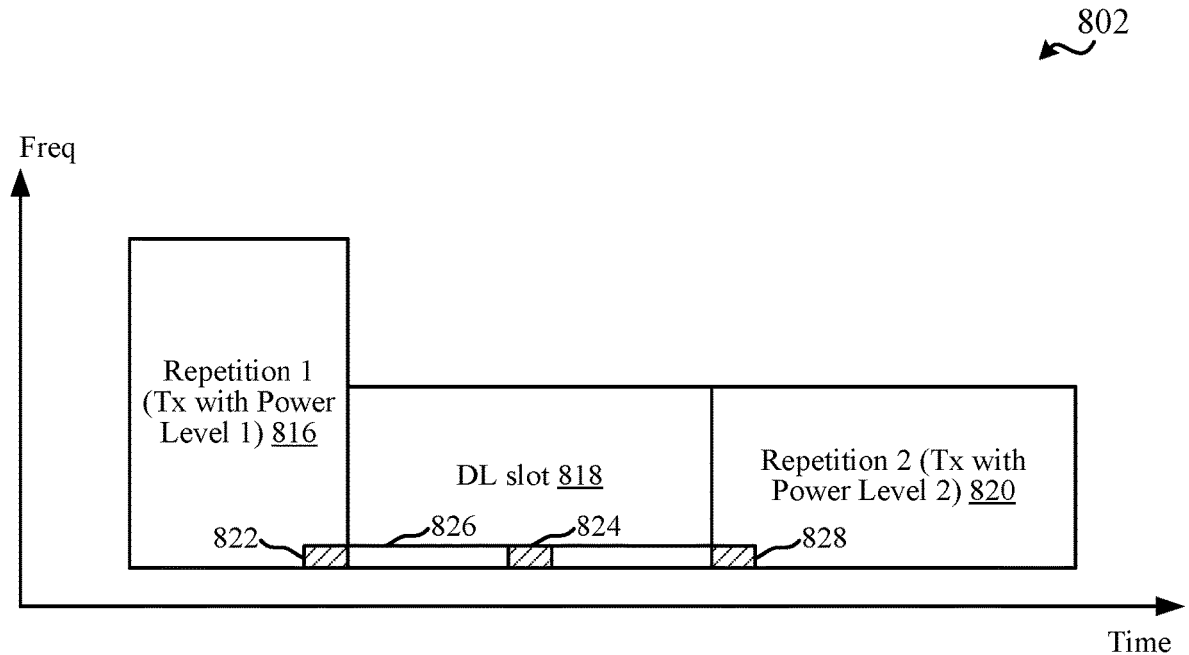

FIG. 8 illustrates examples of resource allocations 800, 802 for multiple repetitions with each repetition having a set of PTRSs including a gap set of PTRSs. For example, resource allocation 800 can include time and frequency resource allocation for repetition 1 804, UL slot 806, and repetition 2 808, where UL slot 806 is the gap between repetitions 804, 808. In addition, in this example, the repetitions 804, 808 can be scheduled in the same or different frequency resources (e.g., the same or different number of subcarriers, RBs, etc.) over the time resources. In an example, the UE (e.g., UE 104 and/or an associated UE communicating component 342) can transmit repetitions 804, 808 at different power levels. The repetitions can each have a different phase.

As shown, a PTRS component 354 can add PTRSs (e.g., PTRS tones) in the repetitions and the gap, including PTRSs 810 in repetition 1 808, gap PTRSs 812 in the UL slot 806, and PTRSs 814 in repetition 2 808. In this example, the PTRSs 810, 814 can be at the OFDM symbol boundary and in the same or similar frequency resources in the repetitions 804, 808. Gap PTRS 812 can also be in the same or similar frequency resources as PTRSs 810, 814, and can be in the middle of the UL slot 806 or in another time instance within the UL slot 806, and the UE may not have a scheduled transmission in the UL slot 806. In one example, placing the gap PTRSs 812 in the middle or substantially central time instance (e.g., symbol) within the UL slot 806 can facilitate more accurate estimation of the phase difference between the PTRSs (e.g., between PTRSs 810, 814 and/or gap PTRSs 812), and thus the phase difference between the repetitions (e.g., repetition 1 804 and repetition 2 808) with the gap in between.

In an example, PTRS processing component 452 of a node receiving the repetitions 804, 808 can compute the phase difference between repetition 1 804 and repetition 2 808 based on the phase difference between PTRSs 812 and 810 and between PTRSs 812 and 814 (e.g., as (phase of PTRSs 812−phase of PTRSs 810)+(phase of PTRSs 814−phase of PTRSs 812)). Repetition combining component 454 can perform joint channel estimation of, or otherwise combine, the repetitions 804, 808 based on the phase difference.

For example, resource allocation 802 can include time and frequency resource allocation for repetition 1 816, DL slot 818, and repetition 2 820, where DL slot 818 is the gap between repetitions 816, 820. In addition, in this example, the repetitions 816, 820 can be scheduled in the same or different frequency resources (e.g., the same or different number of subcarriers, RBs, etc.) over the time resources. In an example, the UE (e.g., UE 104 and/or an associated UE communicating component 342) can transmit repetitions 816, 820 at different power levels. The repetitions can each have a different phase.

As shown, a PTRS component 354 can add PTRSs (e.g., PTRS tones) in the repetitions and the gap, including PTRSs 822 in repetition 1 816, gap PTRSs 824 in an UL subband 826 of the DL slot 818, and PTRSs 828 in repetition 2 820. In this example, the PTRSs 822, 828 can be at the OFDM symbol boundary and in the same or similar frequency resources in the repetitions 816, 820. Gap PTRS 824 can also be in the same or similar frequency resources as PTRSs 822, 828, and can be in the middle of the DL slot 818 or in another time instance within the DL slot 818, and the UE may not have a scheduled transmission in the DL slot 818. In one example, placing the gap PTRSs 824 in the middle or substantially central time instance (e.g., symbol) within the DL slot 818 can facilitate more accurate estimation of the phase difference between the PTRSs (e.g., between PTRSs 822, 828 and/or gap PTRSs 824), and thus the phase difference between the repetitions (e.g., repetition 1 816 and repetition 2 820) with the gap in between.

In an example, PTRS processing component 452 of a node receiving the repetitions 816, 820 can compute the phase difference between repetition 1 816 and repetition 2 820 based on the phase difference between PTRSs 824 and 822 and between PTRSs 828 and 824 (e.g., as (phase of PTRSs 824−phase of PTRSs 822)+(phase of PTRSs 828−phase of PTRSs 824)). Repetition combining component 454 can perform joint channel estimation of, or otherwise combine, the repetitions 816, 820 based on the phase difference. In the above examples, if the gap is a UL slot, UE can transmit PTRS (only) in the gap even it has no PUCCH/PUSCH to transmit. If the GAP is a DL slot, UE can apply the subband full duplex (SBFD) to create a small dedicated UL subband in the DL slot to transmit UL PTRS. With inserted PTRS in the middle, receiver can estimate (phase c−phase a), and (phase b−phase c), receiver can derive phase b−phase a=(phase c−phase a)+(phase b−phase c), where phase a is the phase of the PTRS in the first repetition, phase b is the phase of the PTRS in the second repetition, and phase c is the phase of the PTRS in the gap.

Moreover, in an example, the density of inserted PTRS in the gap can be configured by the network (e.g., in radio resource control (RRC) signaling configured by network, which can be based on Doppler/UE speed information). In method 600, optionally at Block 608, a configuration indicating a density for transmitting the gap set of PTRSs can be transmitted. In an aspect, PTRS processing component 452, e.g., in conjunction with processor(s) 412, memory 416, transceiver 402, BS communicating component 442, etc., can transmit the configuration indicating the density for transmitting the gap set of PTRSs. For example, the configuration can identify a number of PTRSs to transmit in a gap, frequency locations for the gap set of PTRSs, and/or the like. As described, for example, PTRS processing component 452 can determine the specific configuration for a given UE based on certain characterizes of the UE, such as Doppler or UE speed information that the network node can acquire from or for the UE. For example, PTRS processing component 452 may configure higher density gap PTRS tones for a UE having a higher Doppler and/or higher speed of movement, as this may result in a more variable radio environment at the UE. In addition, for example, PTRS processing component 452 can transmit the configuration to the UE(s) in RRC signaling, media access control-control element (MAC-CE), downlink control information (DCI), etc.

In method 500, optionally at Block 508, a configuration indicating a density for transmitting the gap set of PTRSs can be received. In an aspect, PTRS component 354, e.g., in conjunction with processor(s) 312, memory 316, transceiver 302, UE communicating component 342, etc., can receive the configuration indicating the density for transmitting the gap set of PTRSs. For example, the configuration can identify a number of PTRSs to transmit in a gap, frequency locations for the gap set of PTRSs, and/or the like. PTRS component 354 can accordingly insert PTRS tones in a gap (e.g., in an UL slot or UL subband of a DL slot) based on parameters indicated in the configuration, such as in indicated frequency locations, according to a number of PTRS tones to transmit, etc.

Figure 9:
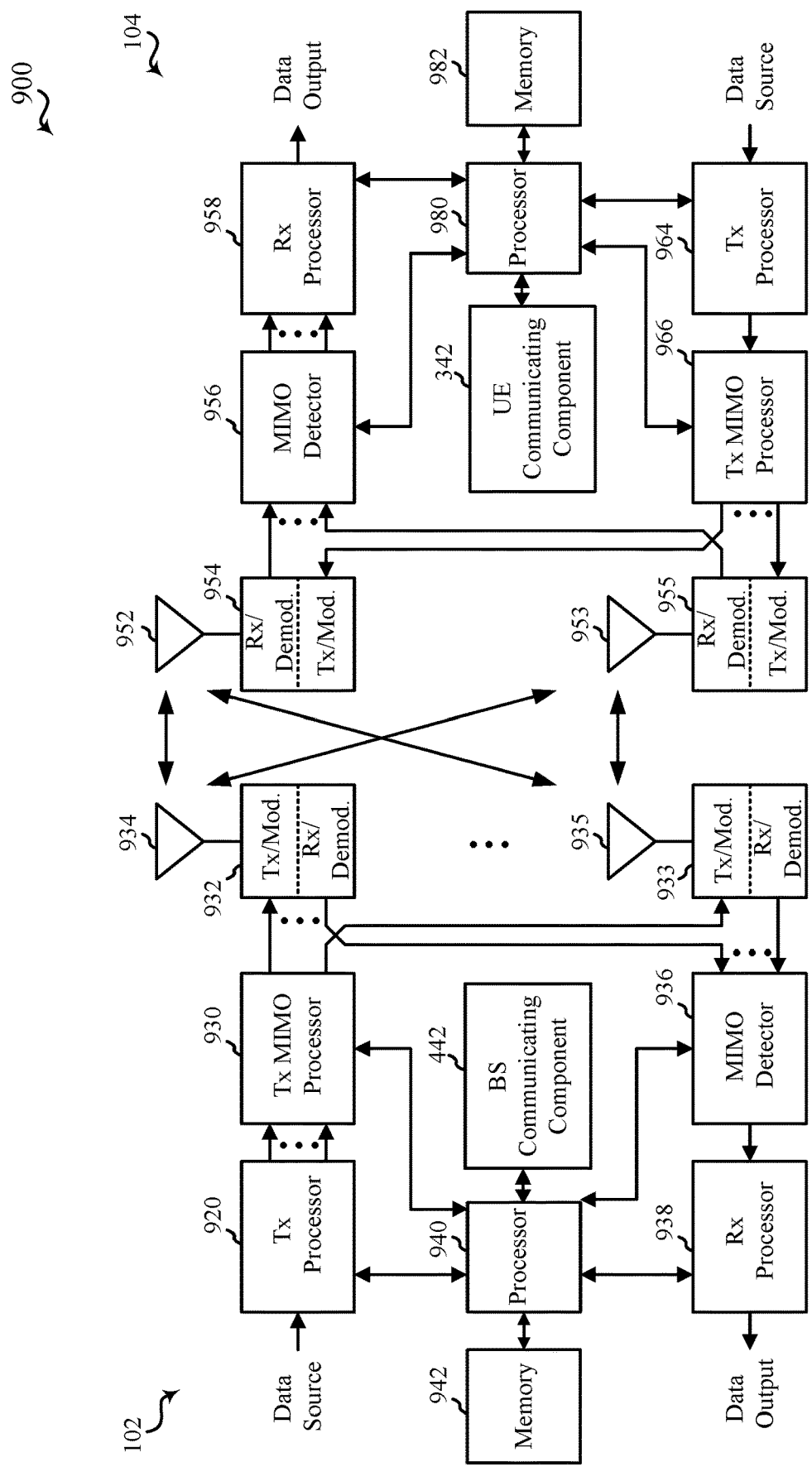
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1 and 3. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a UE communicating component 342 (see e.g., FIGS. 1 and 3).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for single carrier-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication at a UE including generating multiple repetitions of an uplink signal for transmission, and transmitting the multiple repetitions of the uplink signal, where each repetition of the multiple repetitions includes a set of PTRSs.

In Aspect 2, the method of Aspect 1 includes where the multiple repetitions are contiguous in time, and where the set of PTRSs in each repetition are on a time boundary symbol between each repetition.

In Aspect 3, the method of Aspect 2 includes where transmitting the multiple repetitions includes transmitting at least two repetitions of the multiple repetitions at a different power level.

In Aspect 4, the method of any of Aspects 2 or 3 includes where transmitting the multiple repetitions includes transmitting at least two repetitions of the multiple repetitions using a different number of RBs.

In Aspect 5, the method of any of Aspects 1 to 4 includes where the multiple repetitions are not contiguous in time such that there is a gap in time between at least two repetitions of the multiple repetitions, and transmitting a gap set of PTRSs in the gap.

In Aspect 6, the method of Aspect 5 includes where the gap includes an uplink slot during which the UE is not scheduled to transmit uplink communications.

In Aspect 7, the method of any of Aspects 5 or 6 includes where the gap includes a downlink slot, and applying subband full duplex to create an uplink subband in the downlink slot for transmitting the gap set of PTRSs.

In Aspect 8, the method of any of Aspects 5 to 7 includes receiving a configuration indicating a density for transmitting the gap set of PTRSs, where transmitting the gap set of PTRSs includes transmitting multiple gap PTRSs in the gap based on the density.

In Aspect 9, the method of any of Aspects 1 to 8 includes where the uplink signal includes one of a PUCSH, PUCCH, PRACH, or SRS.

Aspect 10 is a method for wireless communication at a network node including receiving, for a UE, multiple repetitions of an uplink signal, where each repetition of the multiple repetitions includes a set of PTRSs, and combining, based on a phase difference computed from the set of PTRSs for each repetition of the multiple repetitions, the multiple repetitions of the uplink signal for decoding the uplink signal.

In Aspect 11, the method of Aspect 10 includes where the multiple repetitions are contiguous in time, where the PTRSs in each repetition are at a time boundary symbol between each repetition, and where combining the multiple repetitions is based on estimating the phase difference between the set of PTRSs for each repetition.

In Aspect 12, the method of Aspect 11 includes where at least two repetitions of the multiple repetitions are received at a different power level.

In Aspect 13, the method of any of Aspects 11 or 12 includes where receiving the multiple repetitions includes receiving at least two repetitions of the multiple repetitions in a different number of RBs.

In Aspect 14, the method of any of Aspects 10 to 13 includes where the multiple repetitions are not contiguous in time such that there is a gap in time between at least two repetitions of the multiple repetitions, and receiving a gap set of PTRSs in the gap, where combining the multiple repetitions is based on estimating the phase difference between the set of PTRSs for each repetition and/or the gap set of PTRSs.

In Aspect 15, the method of Aspect 14 includes where combining the multiple repetitions is based on estimating the phase difference between a first set of PTRSs for a first repetition of the multiple repetitions and the gap set of PTRSs, and estimating the phase difference between the gap set of PTRSs and a second repetition of the multiple repetitions, where the gap is between the first repetition and the second repetition.

In Aspect 16, the method of any of Aspects 14 or 15 includes where the gap includes an uplink slot during which the UE is not scheduled to transmit uplink communications.

In Aspect 17, the method of any of Aspects 14 to 16 includes where the gap includes a downlink slot, and applying subband full duplex to create an uplink subband in the downlink slot for receiving the gap set of PTRSs.

In Aspect 18, the method of any of Aspects 14 to 17 includes transmitting a configuration indicating a density for transmitting the gap set of PTRSs, where receiving the gap set of PTRSs includes receiving multiple gap PTRSs in the gap based on the density.

Aspect 19 is an apparatus for wireless communication including a processor, memory coupled with the processor, and instructions stored in the memory and operable, when executed by the processor, to cause the apparatus to perform any of the methods of Aspects 1 to 18.

Aspect 20 is an apparatus for wireless communication including means for performing any of the methods of Aspects 1 to 18.

Aspect 21 is a computer-readable medium including code executable by one or more processors for wireless communications, the code including code for performing any of the methods of Aspects 1 to 18.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a processor;
   memory coupled with the processor; and
   instructions stored in the memory and operable, when executed by the processor, to cause the apparatus to:
   generate multiple repetitions of an uplink signal for transmission;
   transmit the multiple repetitions of the uplink signal, wherein each repetition of the multiple repetitions includes a set of phase tracking reference signals (PTRSs), wherein the multiple repetitions are not contiguous in time such that there is a gap in time between at least two repetitions of the multiple repetitions, and
   transmit a gap set of PTRSs in the gap.

2. The apparatus of claim 1, wherein the set of PTRSs in each repetition are on a time boundary orthogonal frequency division multiplexing (OFDM) symbol between each repetition.

3. The apparatus of claim 2, wherein the instructions, when executed by the processor, cause the apparatus to transmit at least two repetitions of the multiple repetitions at a different power level.

4. The apparatus of claim 2, wherein the instructions, when executed by the processor, cause the apparatus to transmit at least two repetitions of the multiple repetitions using a different number of resource blocks (RBs).

5. The apparatus of claim 1, wherein the gap includes an uplink slot during which the apparatus is not scheduled to transmit uplink communications.

6. The apparatus of claim 1, wherein the gap includes a downlink slot, and wherein the instructions, when executed by the processor, cause the apparatus to apply subband full duplex to create an uplink subband in the downlink slot for transmitting the gap set of PTRSs.

7. The apparatus of claim 1, wherein the instructions, when executed by the processor, cause the apparatus to receive a configuration indicating a density for transmitting the gap set of PTRSs, wherein the instructions, when executed by the processor, cause the apparatus to transmit multiple gap PTRSs in the gap based on the density.

8. The apparatus of claim 1, wherein the uplink signal includes one of a physical uplink shared channel (PUSCH), physical uplink control channel (PUCCH), physical random access channel (PRACH), or sounding reference signal (SRS).

9. An apparatus for wireless communication, comprising:
   a processor;
   memory coupled with the processor; and
   instructions stored in the memory and operable, when executed by the processor, to cause the apparatus to:
   receive, for a user equipment (UE), multiple repetitions of an uplink signal, wherein each repetition of the multiple repetitions includes a set of phase tracking reference signals (PTRSs), wherein the multiple repetitions are not contiguous in time such that there is a gap in time between at least two repetitions of the multiple repetitions;
   receive a gap set of PTRSs in the gap; and
   combine, based on a phase difference computed from the set of PTRSs for each repetition of the multiple repetitions and the gap set of PTRSs, the multiple repetitions of the uplink signal for decoding the uplink signal.

10. The apparatus of claim 9, wherein the PTRSs in each repetition are at a time boundary orthogonal frequency division multiplexing (OFDM) between each repetition.

11. The apparatus of claim 10, wherein at least two repetitions of the multiple repetitions are received at a different power level.

12. The apparatus of claim 10, wherein the instructions, when executed by the processor, cause the apparatus to receive at least two repetitions of the multiple repetitions in a different number of resource blocks (RBs).

13. The apparatus of claim 9, wherein the instructions, when executed by the processor, cause the apparatus to combine the multiple repetitions based on estimating the phase difference between a first set of PTRSs for a first repetition of the multiple repetitions and the gap set of PTRSs, and estimating the phase difference between the gap set of PTRSs and a second repetition of the multiple repetitions, wherein the gap is between the first repetition and the second repetition.

14. The apparatus of claim 9, wherein the gap includes an uplink slot during which the UE is not scheduled to transmit uplink communications.

15. The apparatus of claim 9, wherein the gap includes a downlink slot, and wherein the instructions, when executed by the processor, cause the apparatus to apply subband full duplex to create an uplink subband in the downlink slot for receiving the gap set of PTRSs.

16. The apparatus of claim 9, wherein the instructions, when executed by the processor, cause the apparatus to transmit a configuration indicating a density for transmitting the gap set of PTRSs, wherein the instructions, when executed by the processor, cause the apparatus to receive multiple gap PTRSs in the gap based on the density.

17. A method for wireless communication at a user equipment (UE), comprising:
   generating multiple repetitions of an uplink signal for transmission;
   transmitting the multiple repetitions of the uplink signal, wherein each repetition of the multiple repetitions includes a set of phase tracking reference signals (PTRSs), wherein the multiple repetitions are not contiguous in time such that there is a gap in time between at least two repetitions of the multiple repetitions, and transmitting a gap set of PTRSs in the gap.

18. The method of claim 17, wherein the set of PTRSs in each repetition are on a time boundary orthogonal frequency division multiplexing (OFDM) symbol between each repetition.

19. The method of claim 18, wherein transmitting the multiple repetitions includes transmitting at least two repetitions of the multiple repetitions at a different power level.

20. The method of claim 18, wherein transmitting the multiple repetitions includes transmitting at least two repetitions of the multiple repetitions using a different number of resource blocks (RBs).

21. The method of claim 17, wherein the gap includes an uplink slot during which the UE is not scheduled to transmit uplink communications.

22. The method of claim 17, wherein the gap includes a downlink slot, and further comprising applying subband full duplex to create an uplink subband in the downlink slot for transmitting the gap set of PTRSs.

23. The method of claim 17, further comprising receiving a configuration indicating a density for transmitting the gap set of PTRSs, wherein transmitting the gap set of PTRSs includes transmitting multiple gap PTRSs in the gap based on the density.

24. The method of claim 17, wherein the uplink signal includes one of a physical uplink shared channel (PUCSH), physical uplink control channel (PUCCH), physical random access channel (PRACH), or sounding reference signal (SRS).

25. A method for wireless communication at a network node, comprising:
   receiving, for a user equipment (UE), multiple repetitions of an uplink signal, wherein each repetition of the multiple repetitions includes a set of phase tracking reference signals (PTRSs), wherein the multiple repetitions are not contiguous in time such that there is a gap in time between at least two repetitions of the multiple repetitions;
   receive a gap set of PTRSs in the gap; and
   combining, based on a phase difference computed from the set of PTRSs for each repetition of the multiple repetitions and the gap set of PTRSs, the multiple repetitions of the uplink signal for decoding the uplink signal.

26. The method of claim 25, wherein the PTRSs in each repetition are at a time boundary orthogonal frequency division multiplexing (OFDM) between each repetition, and wherein combining the multiple repetitions is based on estimating the phase difference between the set of PTRSs for each repetition.

27. The method of claim 26, wherein at least two repetitions of the multiple repetitions are received at a different power level.

* * * * *